June 8, 1971 HIROSHI TERAMACHI 3,583,050
METHOD OF THE MANUFACURE OF A SPHERICAL BEARING
Filed Jan. 27, 1969
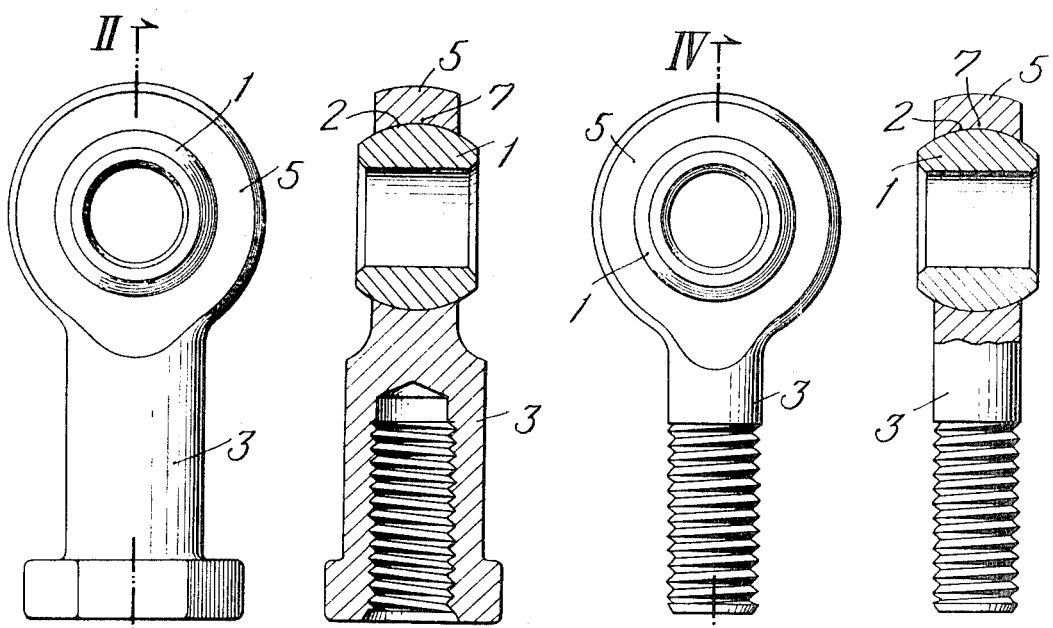
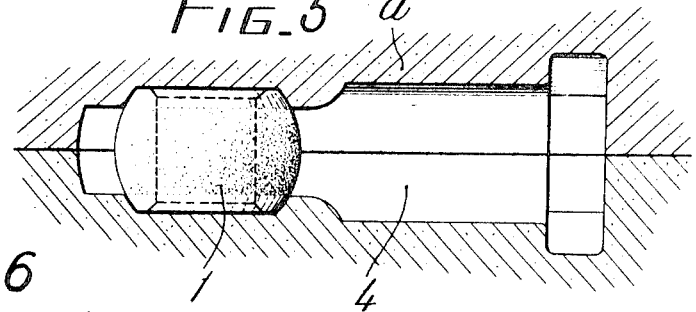
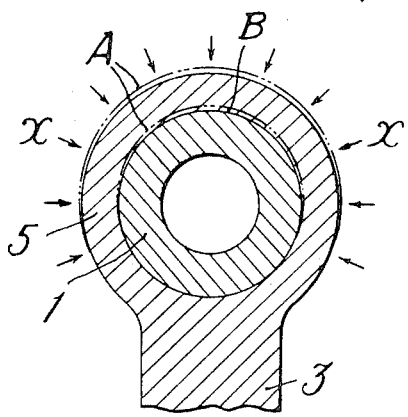
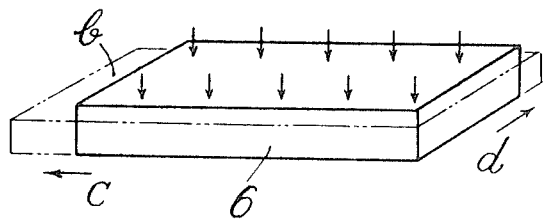
INVENTOR.
HIROSHI TERAMACHI
BY Wenderoth, Lind & Ponack
Attorneys United States Patent Office 3,583,050
Patented June 8, 1971

3,583,050
METHOD OF THE MANUFACTURE OF A SPHERICAL BEARING
Hiroshi Teramachi, Tokyo, Japan, assignor to Nippon Thompson Co., Ltd., Tokyo, Japan
Filed Jan. 27, 1969, Ser. No. 794,067
Claims priority, application Japan, July 19, 1968, 43/51,071
Int. Cl. B23p *11/00, 17/00*
U.S. Cl. 29—149.5                                    1 Claim

ABSTRACT OF THE DISCLOSURE

This specification discloses a method of the manufacture of spherical bearings. A mold is provided to form a rod member which constitutes a part of a spherical bearing. In this mold is positioned an inner spherical wheel as a core, the wheel having the spherical surface thereof provided with a thin film of tin, copper or lead. A charge of molten aluminium is cast into the mold with said inner spherical wheel so positioned as described, to thereby form a spherical head portion of the rod member which holds the inner wheel therein and simultaneously forming a cast aluminium alloy portion having a high bearing performance in the spherical portion of the rod member. After removed from the mold, the rod member with the inner wheel held therein is struck in the spherical head portion from the exterior thereof so as to provide a clearance between the inner surface of the inner wheel holding portion and the outer surface of the inner wheel so that the inner wheel can rotate within the inner wheel holding portion of the rod member. The spherical bearing thus obtained is very much simplified in construction and highly excellent in performance as well as economical to manufacture.

BACKGROUND OF THE INVENTION

This invention relates to a spherical bearing, and more particularly to the method of manufacturing a spherical bearing of high performance which is simple in construction and economical to manufacture.

According to the prior art the spherical bearing was so much complicated in construction that the manufacture thereof was not only greatly troublesome and expensive but also the resultant product was inefficient in performance.

SUMMARY OF THE INVENTION

It is therefore the object of the present invention to provide a method of making a spherical bearing of high performance which is much more simplified in construction and easier and more economical to manufacture than the prior art spherical bearing.

According to the present invention the method of the manufacture of such spherical bearing comprises the steps of providing a mold for forming a rod member of a spherical bearing, positioning in said mold an inner spherical wheel as a core, said wheel having the spherical surface thereof provided with a thin film of tin, copper or lead by plating or coating, casting a charge of molten aluminium into said mold with said inner spherical wheel positioned in said manner to thereby form a spherical head portion of said rod member holding said inner spherical wheel therein, simultaneously forming a cast aluminium alloy portion having a high performance as a plain bearing in the spherical head portion of said rod member, removing said rod member with said inner spherical wheel held therein from said mold, striking said spherical head portion of said rod member holding said inner spherical wheel from the exterior thereof to thereby provide a clearance between the inner surface of said inner wheel holding portion of the rod member and the outer surface of said inner wheel so that the inner spherical wheel can rotate within the inner wheel holding portion of the rod member.

DESCRIPTION OF THE PREFERRED EMBODIMENTS

The present invention will now be described in greater detail with respect to preferred embodiments thereof as shown in the accompanying drawings, in which:

FIG. 1 is a front view of an example of the product obtained according to the method of the present invention;

FIG. 2 shows a longitudinal cross-section taken along line II—II of FIG. 1;

FIG. 3 is a front view of a slightly modified form of the product according to the present invention;

FIG. 4 is a longitudinal cross-sectional view taken along line IV—IV of FIG. 3;

FIG. 5 is a cross-sectional view for illutsrating the manner in which the casting is carried out in the mold according to the present invention;

FIG. 6 is a plan view for illustrating the manner in which a clearance is provided in the spherical portion of the bearing; and FIG. 7 is a perspective view for illustrating the principle of the FIG. 6 procedure.

Referring now to FIGS. 1 and 3 showing a first and a second example of the spherical bearing provided according to the method of the present invention, there is previously prepared an inner spherical wheel 1 which has been subjected to a prescribed heat treatment and polishing operation, with a resultant hardness as high as HrC 60 to 66. The spherical inner wheel 1 has a spherical portion 2 the surface of which is smoothly polished. Over a part of the surface of said spherical portion 2 of the inner spherical wheel 1 there is applied a thin film of tin, copper or lead by plating or coating method.

Subsequently, as shown in FIG. 5, a mold *a*, preferably of the die-casting type suitable for mass production, is prepared which is provided with a cavity 4 adapted for forming a rod member 3 (FIGS. 1 to 4). In said mold *a* is positioned said inner spherical wheel 1 as a "core" as it is called in the molding method. A charge of molten aluminium is then introduced into said cavity 4 of the mold *a* with the inner spherical wheel 1 positioned as described. Thereupon the thin film of tin, copper or lead applied over a part of the spherical surface of the inner spherical wheel 1 is mixed with said molten aluminium to thereby form an aluminium alloy film having a high bearing performance. When the formed rod member 3 with the inner wheel 1 is removed from the mold, the inner spherical wheel 1 is perfectly held within the spherical head 5 of the rod member 3, in such relationship that the rod member tightens the inner spherical wheel 1 due to the difference in coefficient of contraction between the aluminium forming the rod member and the material forming the inner spherical wheel, whereby the inner spherical wheel 1 cannot rotate within the spherical head portion 5 of the rod member holding the inner wheel. Thereupon, the spherical head portion 5 of the rod member 3 holding the inner spherical wheel 1 is struck from the exterior thereof in the direction as shown by the arrows *x* in FIG. 6, so that the spherical head portion 5 holding the inner spherical wheel 1 will be dilated into a form as shown by the imaginary lines A in FIG. 6. Thus, there is provided a clearance B between the inner surface of the head portion 5 and the outer surface of the inner spherical wheel 1.

The principle for the formation of such clearance will be understood with reference to FIG. 7. Assume that a basic plate 6 of a predetermined thickness is rolled. Then the basic plate 6 will be dilated lengthwise and widthwise in the directions as represented by the arrows c and d to thereby take a rolled form as shown by the imaginary lines b. This will help to readily understand how the clearance B is provided between the head portion 5 of the rod member 3 and the inner spherical wheel 1.

Subsequently the rod member 3 is subjected to removal of casting fins and other predetermined mechanical processes such as formation of an internally threaded bore toward one end of the rod member 3 or formation of an external thread on the outer surface of the same rod member, whereby there is obtained an end product as shown in FIGS. 1 and 2 or FIGS. 3 and 4.

In the spherical bearing thus provided, the hardness of the inner spherical wheel 1, which is normally in the range of HrC 60 to 66, is reduced to the range of HrC 40 to 45 because the wheel 1 is subjected to a high temperature during the casting of the rod member 3, whereas the rod member 3 retains a sufficient function as a metal because the rod member and the inner spherical wheel 1 is in surface contact with each other and because that portion of the rod member 3 which holds the inner spherical wheel 1 is composed of an aluminium alloy having a high performance as a plain bearing. Also, the spherical portion 2 of the inner spherical wheel 1 has a high sphericalness and a highly smooth surface. Furthermore, the film coating applied over a part of the inner spherical wheel surface serves to help the cast material to readily fit to the surface to the inner spherical wheel 1 and prevent any pores or the like from being produced in the rod member 3, whereby the spherical head portion thereof can be of high quality.

Still furthermore, the clearance B between the inner spherical wheel 1 and the spherical head portion 5 of the rod member 3 can be readily determined by adjusting the degree in which the inner wheel holding portion 5 of the rod member 3 is struck from the exterior thereof, and consequently the end product obtained can be of high performance and high quality. The use of aluminium as the material for the rod member 3 also results in the light weight and low deformability of the product, which is suitable for use with aircrafts and the like. Moreover, the number of the parts required is smaller than in the conventional bearing of this type and the procedures of processing are much more simplified with a resultant lower cost of manufacture.

Whilst the present invention has been disclosed with respect to preferred examples thereof, it should be noted that the true scope of the invention is only limited by the appended claim.

What I claim is:

1. A method of the manufacture of a spherical bearing, comprising the steps of providing a mold for forming a rod member of a spherical bearing, positioning in said mold an inner spherical wheel as a core, said wheel having the spherical surface thereof provided with a thin film of tin, copper or lead by plating or coating, casting a charge of molten aluminium into said mold with said inner spherical wheel positioned in said manner to thereby form a spherical head portion of said rod member holding said inner spherical wheel therein, simultaneously forming a cast aluminium alloy portion having a high performance as a plain bearing in the spherical head portion of said rod member, removing said rod member with said inner spherical wheel held therein from said mold, striking said spherical head portion of said rod member holding said inner spherical wheel from the exterior thereof to thereby provide a clearance between the inner surface of said inner wheel holding portion of the rod member and the outer surface of said inner wheel so that the inner spherical wheel can rotate within the inner wheel holding portion of the rod member.

References Cited

UNITED STATES PATENTS

| | | | |
|---|---|---|---|
| 2,252,351 | 8/1941 | Paulus | 29—149.5 |
| 3,395,436 | 8/1968 | Sullivan | 29—149.5 |

THOMAS H. EAGER, Primary Examiner

U.S. Cl. X.R.

29—527.5